United States Patent [19]
Fisher

[11] Patent Number: 5,265,668
[45] Date of Patent: Nov. 30, 1993

[54] HEATING AND COOLING SYSTEM FOR VEHICLES

[75] Inventor: Carl J. Fischer, Nappanee, Ind.

[73] Assignee: Four Winds International Corporation, Elkhart, Ind.

[21] Appl. No.: 800,524

[22] Filed: Dec. 2, 1991

[51] Int. Cl.$^5$ ............................................. F25B 29/00
[52] U.S. Cl. ......................................... 165/42; 165/43; 454/127
[58] Field of Search .................... 165/42, 43; 454/127, 454/185

[56] References Cited

U.S. PATENT DOCUMENTS

| | | | |
|---|---|---|---|
| 2,876,998 | 3/1959 | Csabi | 165/43 |
| 2,894,443 | 7/1959 | Rasmussen | 454/127 |
| 2,996,255 | 8/1961 | Boylan | 454/127 |
| 3,004,752 | 10/1961 | Armes et al. | 165/42 |
| 3,170,509 | 2/1965 | De Rees et al. | 165/42 |
| 3,183,962 | 5/1965 | Steinhagen et al. | 165/42 |
| 3,289,564 | 12/1966 | De Coye de Castelet | 454/127 |
| 3,327,603 | 6/1967 | De Coye de Castelet | 454/127 |
| 3,421,576 | 1/1969 | Roane | 165/42 |
| 3,724,357 | 4/1973 | Kavthekar et al. | 454/127 |
| 3,752,223 | 8/1973 | Finch | 165/43 |
| 3,841,395 | 10/1974 | Steinmann | 165/42 |
| 4,223,754 | 9/1980 | Mizuno et al. | 454/127 |
| 4,559,868 | 12/1985 | Nohaka et al. | 454/127 |
| 4,766,805 | 8/1988 | Sato et al. | 454/127 |
| 4,805,522 | 2/1989 | Tonoe et al. | 454/127 |

FOREIGN PATENT DOCUMENTS

| | | | |
|---|---|---|---|
| 2036808 | 1/1972 | Fed. Rep. of Germany | 98/2.11 |
| 3726122 | 12/1988 | Fed. Rep. of Germany | 98/2.11 |
| 0242712 | 6/1988 | Japan | 98/2.09 |
| 0172010 | 7/1989 | Japan | 98/2.09 |

*Primary Examiner*—John K. Ford
*Attorney, Agent, or Firm*—James D. Hall; Thomas J. Dodd

[57] ABSTRACT

An improved heating and cooling system for a vehicle. The system includes a housing mounted in the dash which includes separate passageways and outlets for cool air, heated air, and defrost. The system may also include a second housing communicating with the engine cover to channel the heated or cooled air to the first housing through a blower.

9 Claims, 4 Drawing Sheets

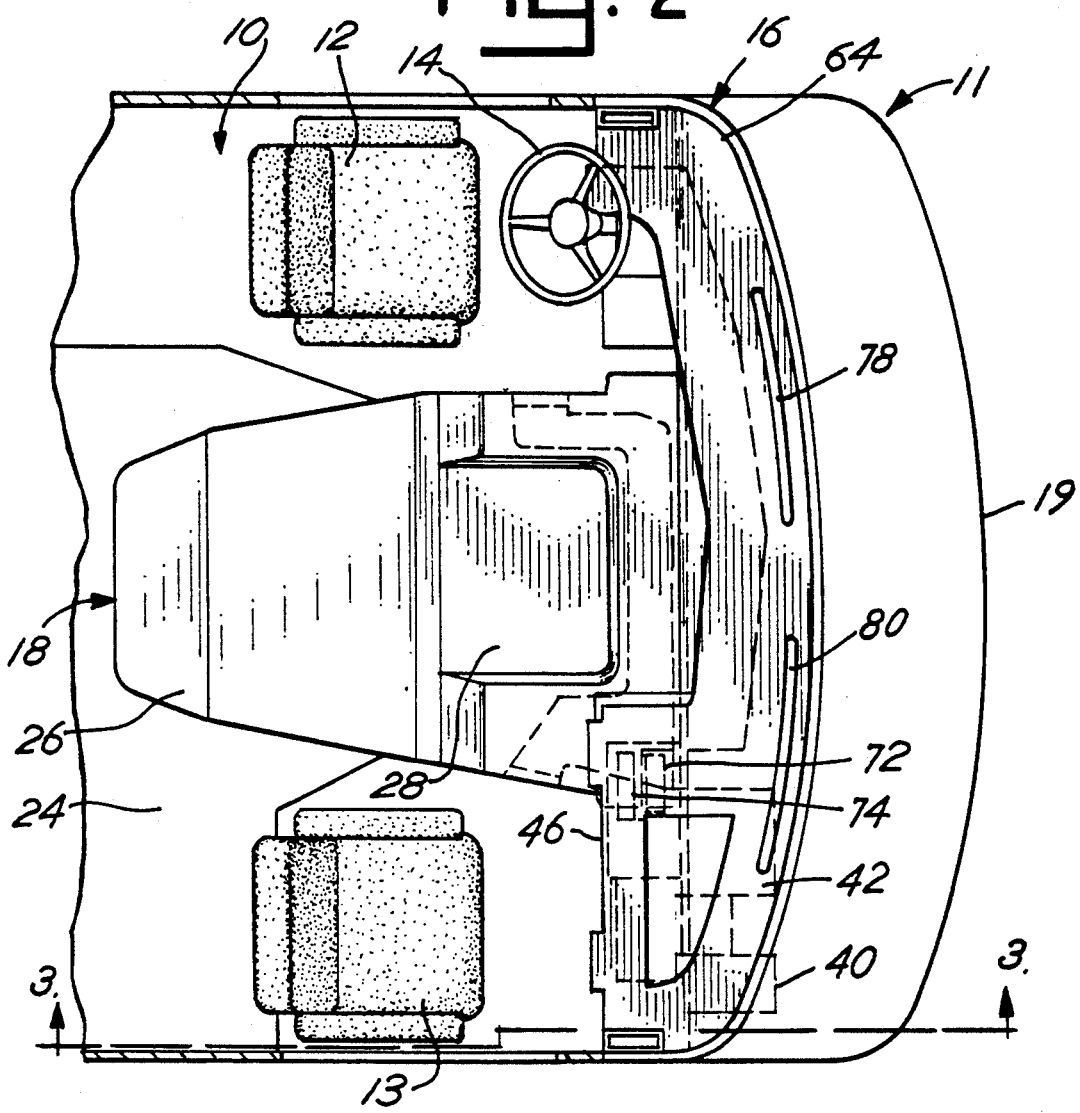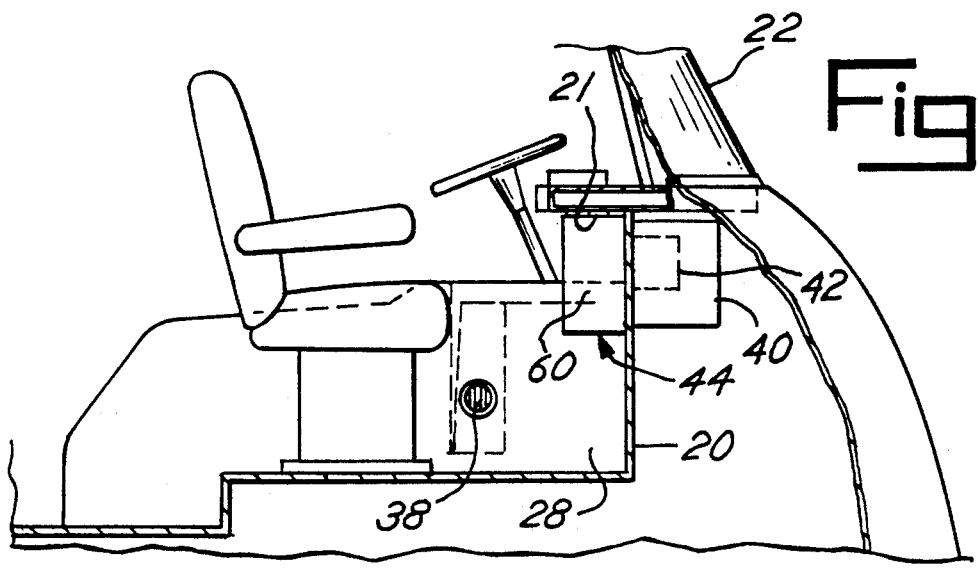

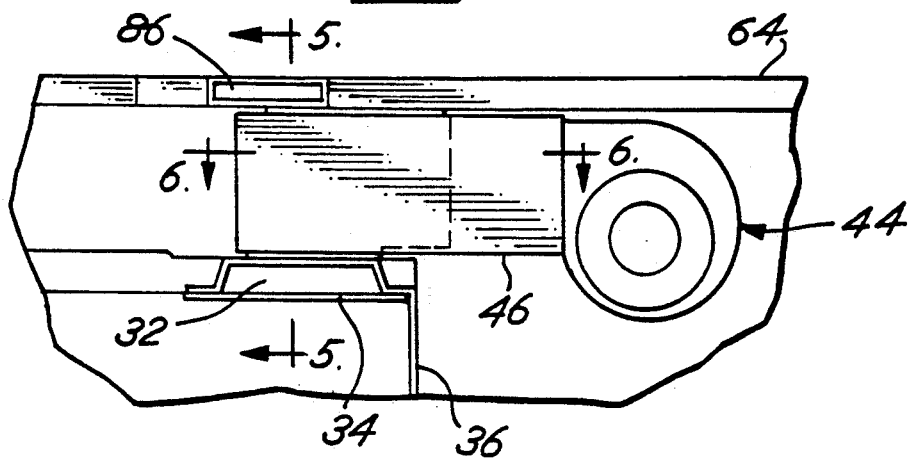
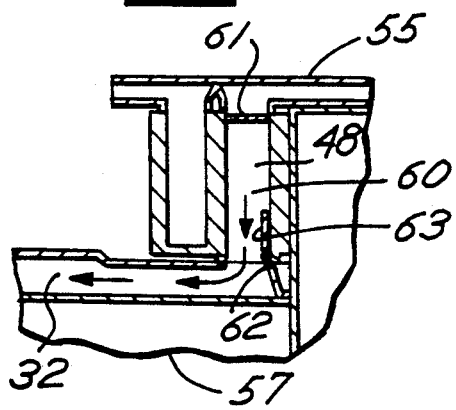
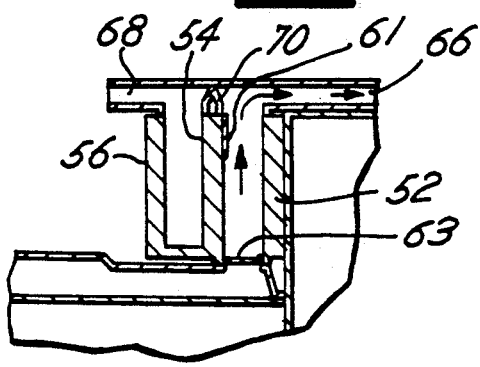
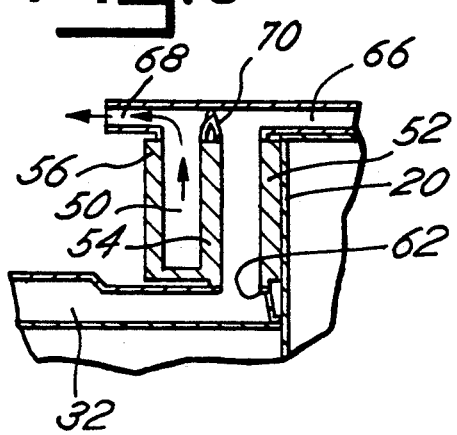
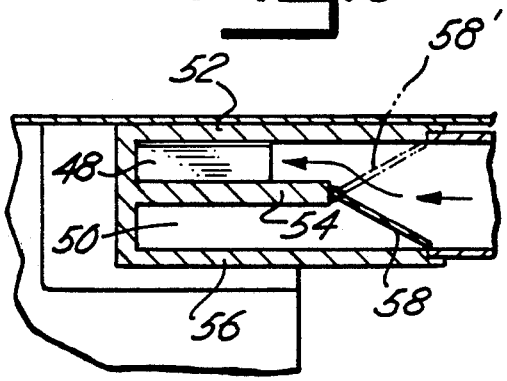

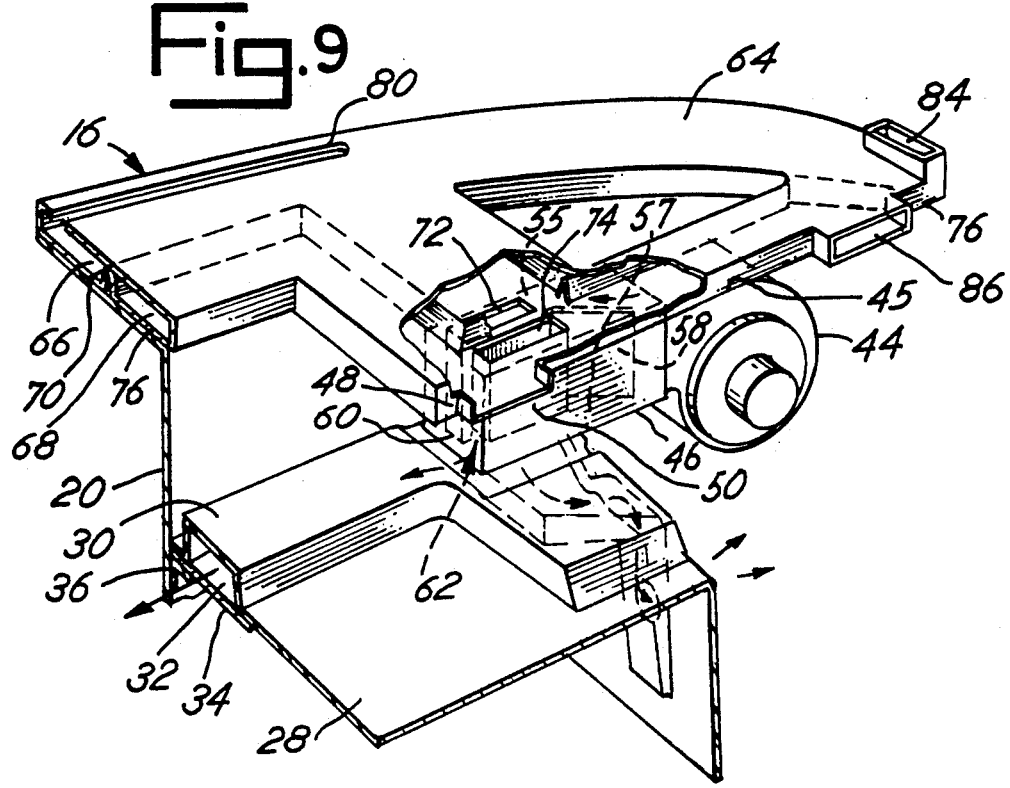
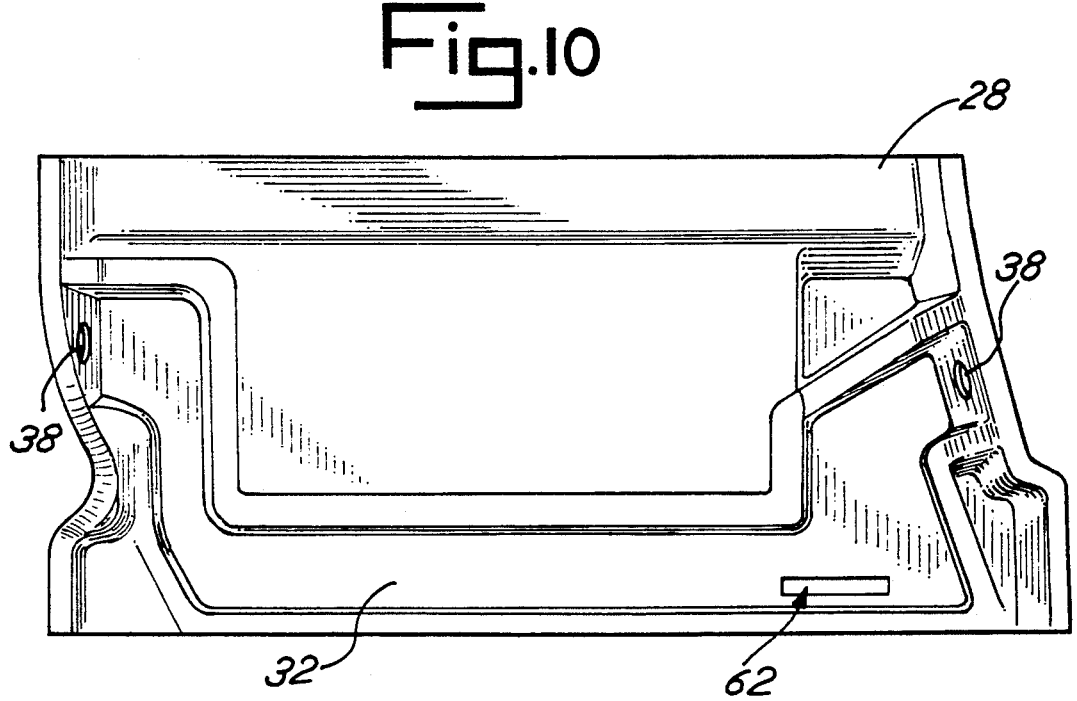

HEATING AND COOLING SYSTEM FOR VEHICLES

BACKGROUND OF THE INVENTION

This invention is related to an improved heating and cooling system for vehicles and will have application to Class A motorhomes.

Most heating and cooling systems require a system of tubes to allow air to flow from the engine or air conditioner through a fan or blower which directs the air to selected vent openings for cooling, heating or defrosting. The tubes require multiple parts (i.e. clamps, gaskets, etc.) for connection to the engine, air conditioner or blower which present increased chances of system failure. Also, system failures in systems which use tubing are more difficult and time consuming to diagnose and repair since the mechanic must check each individual part.

Further, when the tubes become wrinkled or compressed from extended use, air flow inside the tubes is less powerful, which lowers the efficiency of the heating and cooling system.

In most vehicles the engine and air-conditioner are located at the front of the vehicle underneath the hood which is spaced from the dash and requires tubes to transport the air. However, in recreational vehicles such as Class A motorhomes, the engine and air-conditioner are sometimes located in the drivers cab near the dash which permits the use of other systems to transport the air.

SUMMARY OF THE INVENTION

This invention includes interconnected housings which have internal passageways to allow the air to flow to selected vent openings without the use of tubes. One housing is located upon the dash of the vehicle. This housing has one or more inlets which are aligned with outlets on the blower housing for air flow communication with the blower. The blower is mounted to the rear section of the vehicle firewall. An air-conditioner is mounted in front of the firewall with its evaporator core connected to the blower to direct cool air to the dash mounted housing. The blower housing has an opening on the bottom overlying the passageway of the second housing, which abuts against the rear section of the firewall. The rear side of the housing abuts against a cover which substantially encloses the engine or transmission. The blower housing has a flapper valve or venting system for permitting the blower to force heated air through outlets on the sides of the second housing or to the inlet leading into the first housing passageway which communicates with outlets adjacent the vehicle's windshield. The valve or venting system further allows the blower to force cool air into the passageway of the first housing where it is expelled through outlets on the front part of the first housing.

It is an object of this invention to provide a powerful and efficient heating and cooling system for a vehicle.

Another object of this invention to provide a heating and cooling system for a vehicle that is durable and easy to maintain.

Another object is to provide a vehicle heating and cooling system which does not require the use of air circulation pipes.

Other objects will become apparent upon a reading of the following description.

BRIEF DESCRIPTION OF THE DRAWINGS

A preferred embodiment of the invention has been depicted for illustrative purposes only wherein:

FIG. 2 is a fragmented top plan view of the vehicle of FIG. 1.

FIG. 3 is a sectional view taken along line 3—3 of FIG. 2.

FIG. 4 is a fragmented elevation view of the blower housing and the dash mounted housing.

FIG. 5 is a sectional view taken along line 5—5 of FIG. 4 showing the heating function of the system.

FIG. 6 is a sectional view taken along line 6—6 of FIG. 4.

FIG. 7 is a sectional view similar to FIG. 5, showing the system used as a defroster.

FIG. 8 is a sectional view similar to FIG. 5, showing the system used as an air conditioner.

FIG. 9 is a fragmented perspective view of the dash mounted housing with portions broken away or shown in section for illustration.

FIG. 10 is a perspective view of the floor mounted heater distribution housing.

DESCRIPTION OF THE PREFERRED EMBODIMENT

Figure 1:
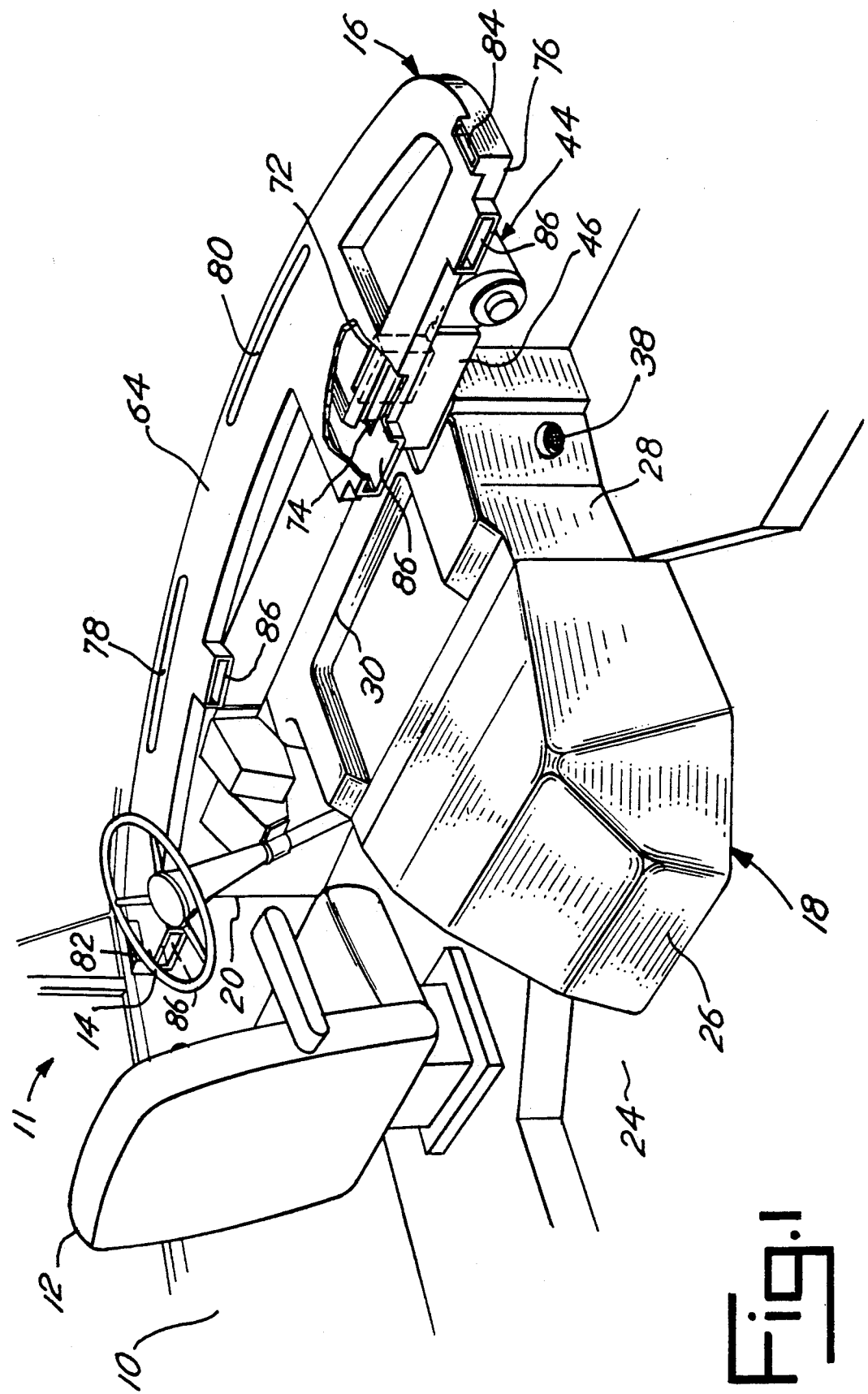
FIG. 1 is a fragmented perspective view of the passenger compartment of a recreational vehicle which employs the heating and cooling system of this invention.

The preferred embodiment herein described is not intended to be exhaustive or to limit the invention to the precise form disclosed. It is chosen and described to explain the principles of the invention and its application and practical use to enable others skilled in the art to utilize its teachings.

Referring now to the drawings, reference numeral 10 as seen in FIG. 2 generally depicts the forward portion of the passenger compartment of a recreational vehicle 11. Compartment 10 houses the conventional items found in most self-propelled RV's, namely, driver's seat 12, steering controls 14, dash 16, and console 18. A passenger seat 13 as seen in FIG. 2 normally located at the right front of compartment 10 has been omitted from FIG. 1 that shows the invention in more detail to allow ease of viewing the invention, as have many of the control levers, radio and other devices commonly found on the dash 16. Passenger compartment 10 is normally separated from a frontmost engine or storage compartment 19 by firewall 20 (FIG. 3) fire wall 20 has a top wall 21. Vehicle 11 also includes windshield 22 and floor 24 as shown.

Console 18 as seen in FIGS. 1 and 2 generally covers the vehicle transmission housing or the engine (not shown) which protrudes upwardly through floor 24 into the passenger compartment between the seats 12 and 13. Console 18 includes a first housing 26 which is connected to floor 24 as by conventional means, and a second housing 28 which is generally U-shaped in cross-sectional configuration (See FIG. 10). Housing 28 is connected at its rearmost end to housing 26, at its frontmost end to firewall 20 and has it lowermost end connected to floor 24 by conventional means. Housing 28 includes an integral raised generally U-shaped portion 30 adjacent its frontmost end. A wall 34 is connected to firewall 20 through bracket 36 and underlies raised portion 30 to define air passageway 32. Outlet vents 38 are located at the sides of housing 28 to allow air flowing through passageway 32 to escape into passenger compartment 10.

Vehicle 11 also includes common items as shown in FIGS. 1 and 2 for supplying heated air and cooled air to the passenger compartment 10, namely, air conditioner 40 and heater 42. Air conditioner 40 and heater 42 are connected in a common manner to firewall 20 and are selectively powered by the vehicle engine (not shown) and regulated by dash mounted switches or levers (not shown). Since the manner by which the heater 42 and air conditioner 40 produce hot and cold air delivered to passenger compartment 10 is common, as are the switches and levers used to regulate their use, further description is omitted in the interests of clarity.

Fan housing 44 is mounted to firewall 20 inside passenger compartment 10 as shown in FIGS. 1 and 3. Fan housing 44 encloses a conventional rotatable vane fan (not shown) which communicates with heater 42 and air conditioner 40 in a common manner as shown in FIG. 2, such as through a direct connection of the fan housing air inlet (not shown) and an outlet (not shown) of the heater and the air conditioner. Normally this connection is made through a hole or holes in firewall 20.

Referring to FIGS. 4–8, fan housing 44 also defines an air direction chamber 46, which in the embodiment shown includes two outlet ports 48, 50 defined by vertical side walls 52, 54 and 56, and by bottom wall 57 and top wall 55 (See FIG. 5). Flapper valve 58 is pivotally connected to wall 54 (See FIG. 6 and 9) to regulate distribution of air to only one of the outlet ports 48, 50. Flapper 58 is manually controlled in a conventional manner by the aforementioned levers or switches (not shown). Outlet port 48 has a lowermost outlet hole 60 which is aligned with inlet hole 62 in raised portion 30 of housing 28 to allow air flow communication between outlet port 48 and air passageway 32 as shown in FIG. 5. Flapper valves 61, 63 are hingedly connected to wall 52 and span respectively, outlet port 48 and hole 60 when in the closed position.

Referring to FIG. 9, vehicle 11 also includes vent housing 64 which is preferably mounted to dash 16 as shown in FIG. 5. Vent housing 64 is preferably of one piece molded construction and defines two separate air passageways 66, 68 which are separated by internal wall 70. Vent housing 64 preferably spans nearly the entire width of passenger compartment 10 as shown in FIG. 2 and has air inlet holes 72, 74 which are aligned with and overlie fan housing outlet ports 48, 50. Vent housing 64 is preferably connected to fan housing 44 and has a lower wall 76 which abuts against the fan housing upper wall 45 to prevent air leakage.

Vent housing 64 has one or more defrost outlets (shown in FIGS. 1, 2 and 9 as front slots 78, 80 and side located vent ports 82, 84) which are located adjacent to vehicle windshield 22 (See FIG. 3). Vent housing 64 also has one or more vent outlets 86 (four shown in FIG. 1) which face rearwardly of firewall 20 into the passenger compartment 10.

The air circulation system described above is capable of three basic functions, that is, supplying heated air or cooled air under pressure to passenger compartment 10, or to supply heated air under pressure to the defrost outlets 78–84 to defrost windshield 22. As stated above, the vehicle driver controls which of the three functions are desired through a common lever and/or switch system (not shown).

To select the air conditioning function, the driver moves the select lever (not shown) to A/C and switches on the fan in fan housing 44. This activates air conditioner 40 to begin the delivery of cooled air through fan housing 44. When the A/C function is selected, flapper 58 is shifted into the position depicted by dotted lines 58 in FIG. 6. This allows the cool air from air conditioner 40 to be drawn into fan housing 44 where it is impelled by the fan (not shown) through outlet port 50, and air inlet hole 74, through air passageway 68 and vents 86 into passenger compartment 10 to cool the passenger compartment (See FIG. 8).

To select the heater function, the driver moves the selection lever (not shown) to HEAT and switches on the fan in fan housing 44. This activates heater 42 to begin delivery of hot air through fan housing 44. When the heat function is selected, flapper 58 is shifted into the position shown in solid lines in FIG. 6, and shifts flapper 61 into the closed position of FIG. 5. Flapper 63 remains in the open position of FIG. 5. This allows hot air from heater 42 to be impelled by the fan (not shown) through fan housing 44 through holes 60 and 62 into passageway 32 of housing 28 and thence through the heater outlet vents 38 to heat passenger compartment 10.

To select the defrost function, the driver slides the selection lever (not shown) to DEFROST and switches on the fan in fan housing 44. This closes flapper 63 and opens flapper 61 to allow hot air to flow through fan housing 44 as shown in FIG. 7, through outlet port 48 and air inlet hole 72, into air passageway 66 and thence through vents 78–84 to deliver hot air to windshield 22. All other DEFROST functions are the same as the HEAT functions described above.

The air circulation system described allows for forced air flow from the heater 42 and air conditioner 40 to the appropriate vent openings without the necessity of using conventional air flow tubes. The manner by which flappers 58, 61 and 63 are operably connected to the selecting lever (not shown) is common and has not been depicted or described in the interests of clarity.

It is understood that the invention is not limited to the precise details above-given, but may be modified within the scope of the following claims.

What I claim is:

1. In combination, a vehicle having a passenger compartment and air circulation means for flowing air through said passenger compartment, said air circulation means comprising a fire wall having a top wall and a side wall, a dashboard having a vent housing located in said passenger compartment, said vent housing including a lower wall positioned atop said top wall, said vent housing defining first and second internal passageways, said vent housing including first and second air inlet means for introducing air into a selected one of said first and second passageways, said vent housing further including first and second air outlet means communicating with said first and second passageways for expelling air out of said selected one passageway into said passenger compartment, means connected in flow communication to said vent housing for impelling air under pressure into and through said selected one passageway, said air circulation means further including a console for covering an engine of said vehicle, said console including a second housing defining an internal plenum, said console located at a rear of said dashboard in said passenger compartment, said second housing in flow communication with said vent housing, valving means operably connected between said vent housing and second housing for directing air from said means for impelling into a selected one of said vent housing and second housing.

2. The combination of claim 1 wherein said vehicle includes cooling means for impelling cool air through said vent housing into said passenger compartment and heating means for impelling heated air through said vent housing into said passenger compartment, said cooling means in flow communication with said first inlet, said heating means in flow communication with said second inlet.

3. The combination of claim 1 wherein said vehicle includes heating means connected in flow communication to said vent housing first inlet means.

4. The combination of claim 1 wherein said vent housing includes an internal wall, said wall dividing said passageways into a first air passage and a second air passage.

5. The combination of claim 1 and second valving means operably connected to said means for impelling, said second valving means for directing air into a selected one of said first and second passageways.

6. The combination of claim 1 wherein said vehicle is a recreational vehicle.

7. The combination of claim 1 wherein said first and second air inlet means are enclosed by a chamber having a top wall, bottom wall and side walls, said first and second air inlet means being separated from each other by an internal wall.

8. The combination of claim 1 wherein said dashboard has a front end and a rear end, said first and second air inlet means being located in said rear end of said dashboard.

9. The combination of claim 1 wherein said second housing has opposite sides, said second housing having a passageway extending from said opposite sides, said second housing further having an outlet means located on each of said opposite sides.

* * * * *

UNITED STATES PATENT AND TRADEMARK OFFICE
CERTIFICATE OF CORRECTION

PATENT NO. : 5,265,668

DATED : November 30, 1993

INVENTOR(S) : Carl J. Fischer

It is certified that error appears in the above-identified patent and that said Letters Patent is hereby corrected as shown below:

On title page, item [19], "Fisher" should read --Fischer--

Signed and Sealed this

First Day of February, 1994

Attest:

BRUCE LEHMAN

Attesting Officer

Commissioner of Patents and Trademarks